United States Patent [19]
Mahlein

[11] 4,395,090
[45] Jul. 26, 1983

[54] OPTICAL CUT-OFF FILTER

[75] Inventor: Hans F. Mahlein, Unterhaching, Fed. Rep. of Germany

[73] Assignee: Siemens Aktiengesellschaft, Berlin & Munich, Fed. Rep. of Germany

[21] Appl. No.: 240,868

[22] Filed: Mar. 5, 1981

[30] Foreign Application Priority Data

Mar. 25, 1980 [DE] Fed. Rep. of Germany ....... 3011501

[51] Int. Cl.³ .............................................. G02B 5/28
[52] U.S. Cl. ................................................... 350/166
[58] Field of Search ............................... 350/166, 169

[56] References Cited

PUBLICATIONS

H. A. Macleod, *Thin–Film Optical Filters*, London, Adam Hilger Ltd., 1969, pp. 17-20.

A. N. Elsner, "On the Calculation of Multilayer Interference Coatings with Given Spectral Characteristics," *Optics and Spectroscopy*, vol. 17, No. 3, Sep. 1964, pp. 238-240.

A. F. Turner and P. W. Baumesiter, "Multilayer Mirrors with High Reflectance Over an Extended Spectral Region," *Applied Optics*, vol. 5, No. 1, Jan. 1966, pp. 69-76.

O. S. Heavens and Heather M. Liddell, "Staggered Broad-Band Reflecting Multilayers," *Applied Optics*, vol. 5, No. 3, Mar. 1966, pp. 373-376.

*Primary Examiner*—Bruce Y. Arnold
*Attorney, Agent, or Firm*—Hill, Van Santen, Steadman, Chiara & Simpson

[57] ABSTRACT

An optical cut-off filter characterized by a multi-layer system comprising of a sequence of dielectric layers which are bordered on each side by a transparent medium having an equal or same index of refraction with the index of refraction of each of the dielectric layers being selected so that for a preselected radiation angle of incidence, the band paths of the filter have an envelope of reflected secondary maximum for a component vibrating perpendicular to the radiation plane of incidence and the envelope for a component vibrating parallel to the radiation of planar incidence of the electrical field vector of incident radiation, and both envelopes exhibit zero locations which have a different wavelength due to the selection of the index of refraction of the dielectric layers forming the filter.

10 Claims, 6 Drawing Figures

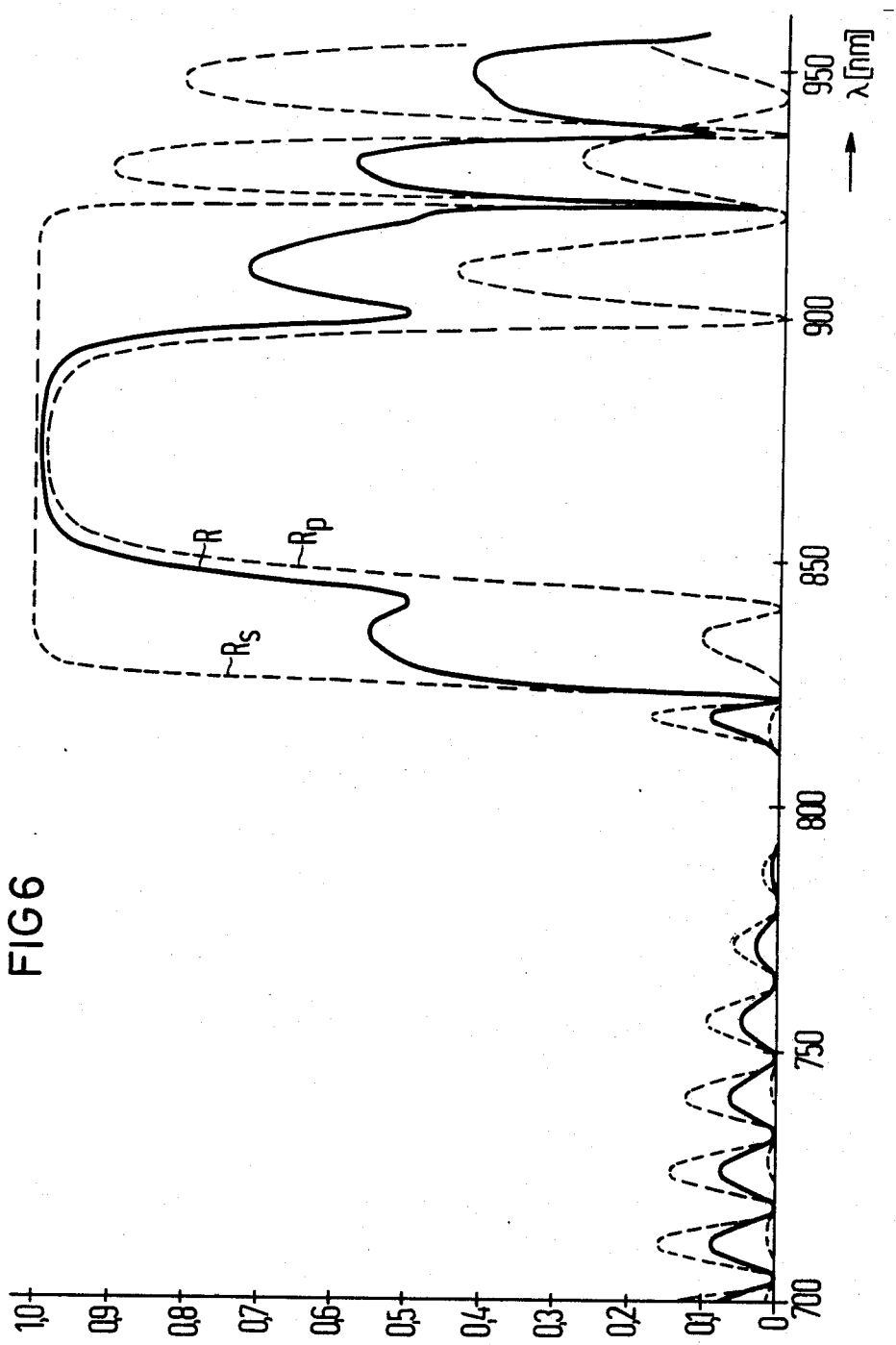

OPTICAL CUT-OFF FILTER

BACKGROUND OF THE INVENTION

The present invention is directed to an optical cut-off filter which is formed of a multi-layer system comprising a sequence of dielectric layers which are interposed between two transparent media having the same index of refraction and the index of refraction of the dielectric layers is selected so that, for a preselected radiation angle of incidence, a pass band of the filter has an envelope of reflection for the secondary maxima for the s-component vibrating perpendicular to the radiation plane of incidence and an envelope for the p-component vibrating parallel to the radiation plane of incidence of the electrical field vector of the incident radiation, which envelopes exhibit zero locations.

An optical cut-off filter of this type has already been proposed. A cut-off filter is employed in optical communication technology as a mirror which is semi-transmissive for selected wavelengths and enables separating or combining different channels. The filters are so dimensioned that in the case of given oblique incidence of radiation, the filters for the wavelength of one channel exhibit at least an essentially disappearing reflectivity whereas for the wavelength of the other channel the filter has a reflectivity of nearly one.

The parameters of the proposed cut-off filter are so dimensioned that an envelope of the reflection-secondary maxima exhibits in the band pass of the filter at least virtually one zero location or position. For wavelengths in the vicinity of the zero location, the reflectivity is then at least virtually zero for the given radiation angle of incidence.

For specific multilayer systems, specific specifications for the dimensions can be disclosed. Such a specific multilayer system can also be so dimensioned that the envelopes of the reflection secondary maxima for radiation components vibrating perpendicular and parallel to the plane of incidence exhibit a common zero location. Such a specific cut-off filter is designated as being optimized. For wavelengths pertaining to the common zero location, the reflectivity is ideally zero for radiation components vibrating perpendicular to the radiation incident plane which components are the s-components as well as for radiation components vibrating parallel to the radiation incident plane which are designated p-components. For wavelengths in the approximate vicinity of the common zero location, the reflectivity for both components is virtually zero. In the case of the optimized cut-off filter, the channel spacing is fixed.

SUMMARY OF THE INVENTION

The present invention is directed to providing an optical cut-off filter which utilizes a multilayer system of dielectric layers and exhibits a lesser channel spacing than an optimized cut-off filter but which is of a comparable quality regarding the reflectivity in the pass band and stop bands.

The object of the present invention is achieved by an improvement in an optical cut-off filter in the form of a multilayer system comprising a sequence of dielectric layers A and B which are interposed between a transparent bordering medium having the index of refraction $n_0$, the index of refraction $n_A$ for each of the layers A and the index of refraction $n_B$ for each of the layers B being selected so that, for a preselected radiation angle of incidence $\theta$, the pass band of the filter has an envelope $E_s$ of the reflecting secondary maxima for the s-component vibrating perpendicular to the radiation plane of incidence and an envelope $E_p$ for the p-component vibrating parallel to the radiation plane of incidence of the electrical field vector of the incident radiation, and each envelope has a zero location. The improvement comprises the indices of refraction $n_A$ and $n_B$ of the dielectric layers A and B of the filter being selected so that the zero locations of the two envelopes $E_s$ and $E_p$ lie at somewhat different wavelengths.

For the benefit of less channel spacing, it is accordingly permitted that the zero locations of the envelope for the s-component and for the p-component lie at somewhat different wavelengths.

Preferred and advantageous embodiments of the cut-off filter accordingly have the layer system exhibiting the layer structure of $$S \left( \frac{A}{2} B \frac{A}{2} \right)^k S$$

wherein $$\left( \frac{A}{2} B \frac{A}{2} \right)^k$$

signifies k multiple sequences of symmetrical layers A and B of a fundamental period of $$\frac{A}{2} B \frac{A}{2} .$$

In this arrangement, the layer A/2 has an index of refraction $n_A$ and the layer B has the index of refraction $n_B$ with S signifying the bordering transparent medium having an index of refraction $n_0$. The indices of refraction $n_A$ and $n_B$ are greater than the index of refraction $n_0$ and preferably the index of refraction $n_A$ is greater than $n_B$.

In the case of a cut-off filter of one of the embodiments in which the two wavelengths are separated, only minor polarization effects will occur. In the case of the wavelengths for the s- and p-components which are being transmitted, reflectivity is virtually zero whereas it reaches virtually 1 for the corresponding component of the wavelength to be reflected.

Moreover, the cut-off filters, according to the above mentioned embodiments, exhibit the behavior generally desired for cut-off filter characteristics. These characteristics are a minimum spectral spacing between the cut-off for the s- and p-components, high reflectivity for both components in the stop band immediately bordering the cut off, minimum reflectivity for both components in the portion of the band pass immediately bordering on the cut-off and a minimum influence of the divergence of the radiation because of filter characteristics.

Figure 3:
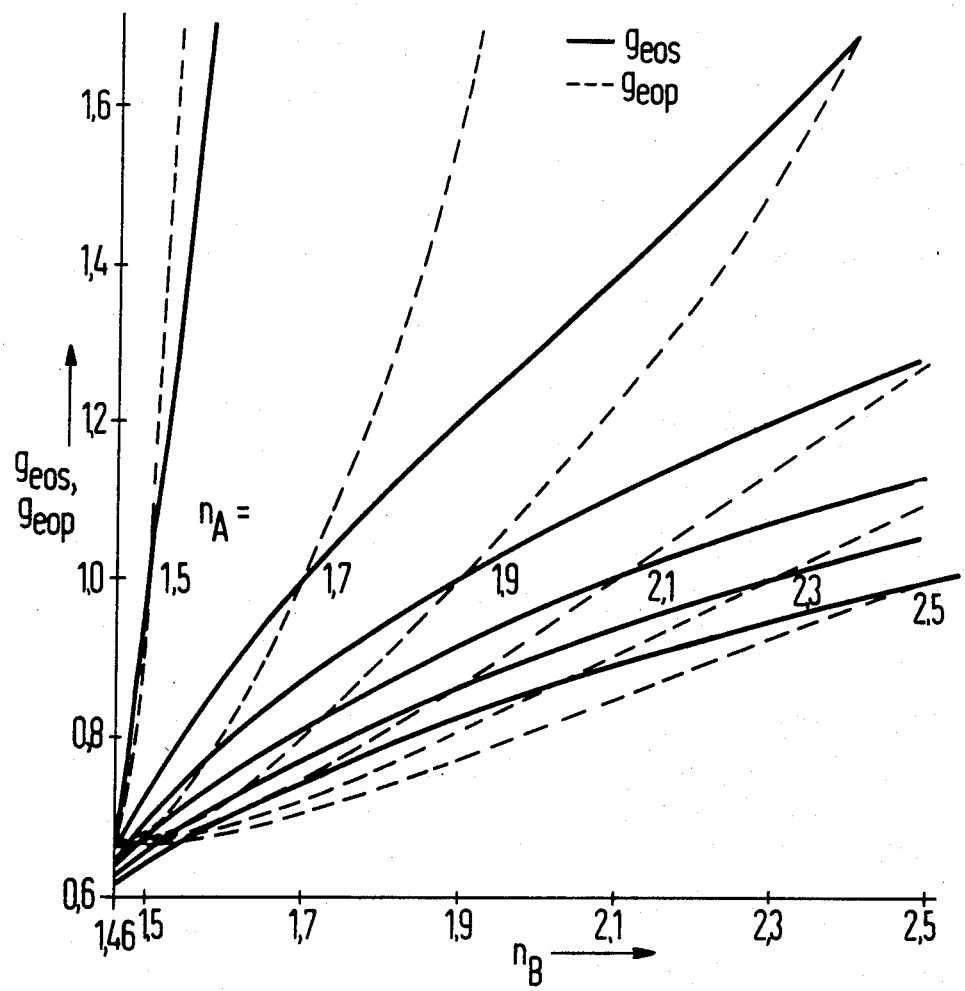

wherein the index of refraction $n_0 = 1.46$ for the bordering transparent medium S, the radiation angle of incidence $\theta_0 = 45°$ with the curves showing the relationship of the indexer of refraction $n_A$ and $n_B$ for the layers A and B and providing information regarding which pairs of indices $n_A$ and $n_B$ provide the envelopes for the secondary maxima which have zero locations;

FIG. 3 illustrates $g_{eos}$-curves (heavy lines) and $g_{eop}$-curves (broken lines) for various indices $n_A$ as the function of the values of the indices $n_B$ for a cut-off filter of the type $$S\left(\frac{A}{2} B \frac{A}{2}\right)^k S,$$

wherein $n_0 = 1.46$, $\theta = 45°$ and the the filter has an order $L = 0$.

Figure 4:
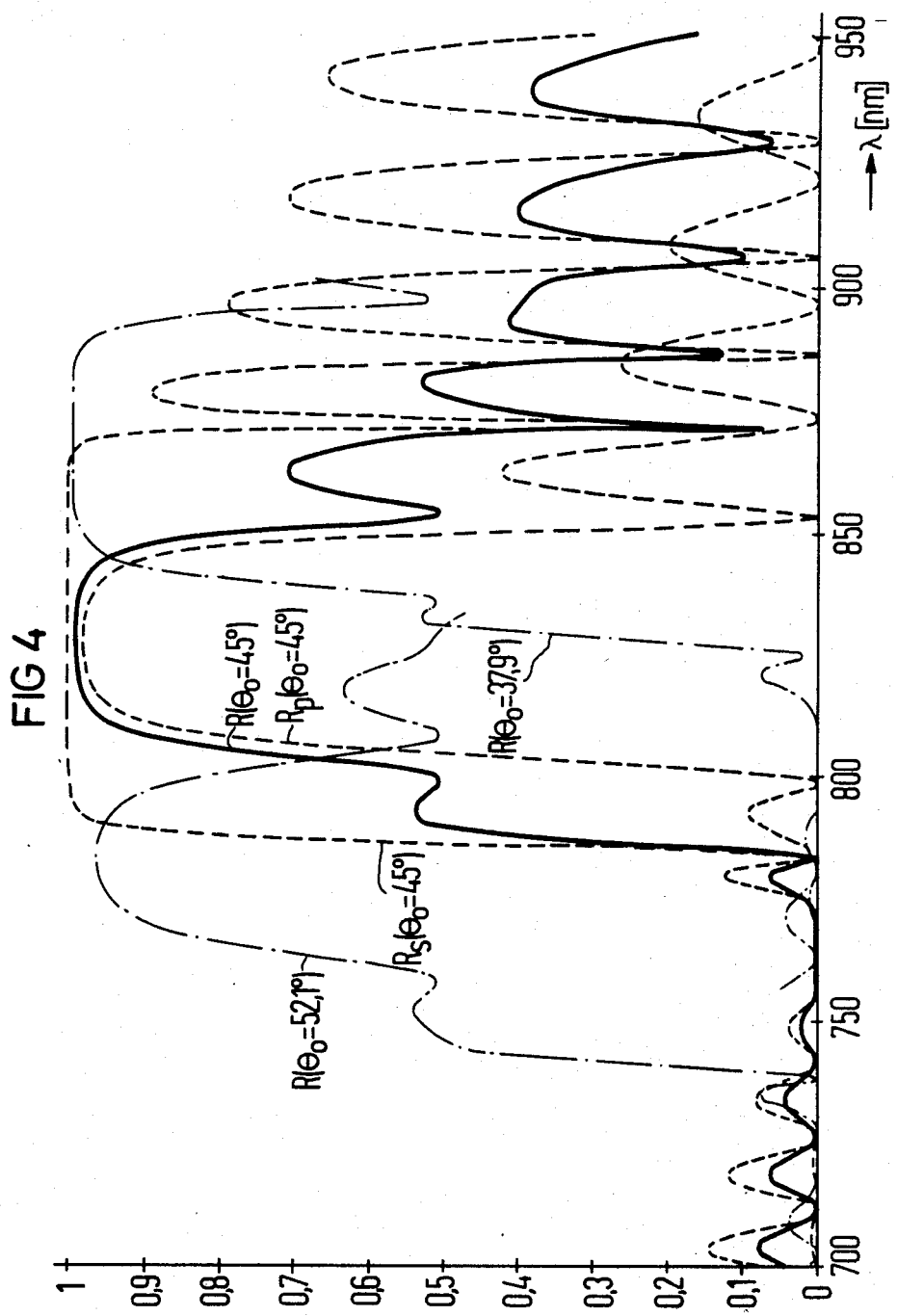
Figure 5:
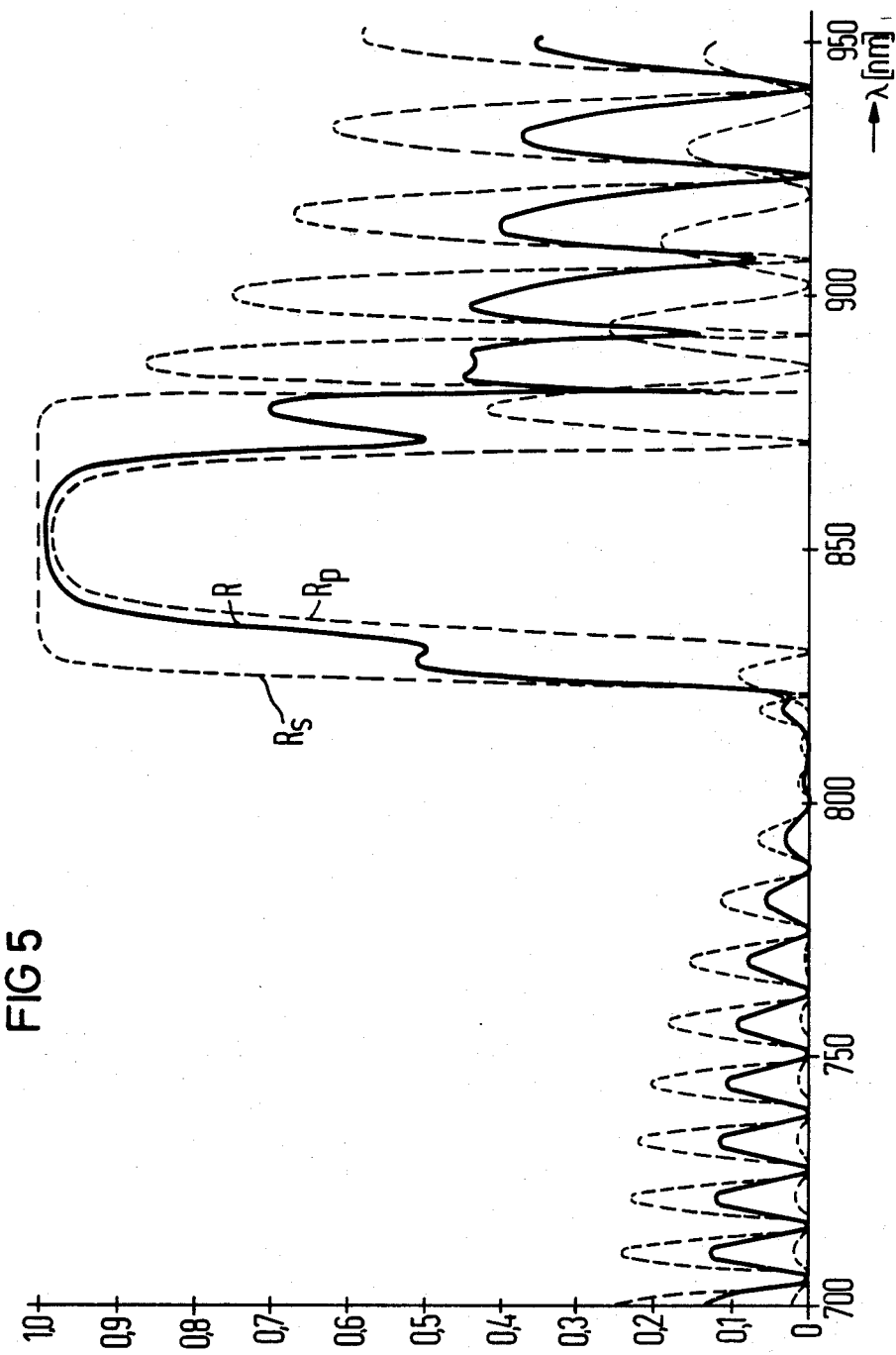

FIG. 4 is a graph having curves for reflectivity versus wavelength for an embodiment of the present invention and includes curves for $\theta = 45°$ for $\theta = 37.9°$ and $\theta = 52.1°$;

FIG. 5 is a graph with curves for the reflectivity versus wavelength for another embodiment of the present invention; and FIG. 6 is another graph showing curves for reflectivity versus wavelength for a third embodiment of the present invention.

DESCRIPTION OF THE PREFERRED EMBODIMENTS

The principles of the present invention are particularly useful in a cut-off filter having a multi-layer system of the types $$S\left(\frac{A}{2} B \frac{A}{2}\right)^k S.$$

The $$\left(\frac{A}{2} B \frac{A}{2}\right)^k$$

signifies k multiples of a sequence of symmetrical layers with a fundamental period of $$\frac{A}{2} B \frac{A}{2}$$

in which a low refractive (higher refractive) layer B is arranged between two higher refractive (lower refractive) layers A. The A/2 signifies that the effective optical layer thickness of layer A is half as great as that of the layer B. The k indicates the number of fundamental periods wherefrom it follows that the number of dielectric layers of the cut-off filter is equal to $2k+1$.

On account of the periodic construction of the filter system taken as the basis and since the reflectivity is a function of the wavelength or wave number for the s- and p-components, one obtains a periodic sequence of stop bands and pass bands, whose height, width and fine structure differs for the s-component and the p-component. The following will apply here: the stop band centers or the pass band centers respectively for the two components coincide respectively. The feature which is of significance for a cut-off filter of this type is that the indices of refraction $n_A$ and $n_B$ of the dielectric layers A and B are selected so that the two envelopes $E_s$ and $E_p$ have zero locations which lie at somewhat different wavelengths. It is also important that the secondary maxima for both components in the two pass bands which form the short wave side and the long wave side respectively join a stop band and are varying greatly. A drop from the stop band to the particular pass band with the lower secondary maxima for the two components is the s-cut off or the p-cut off respectively, which is of interest for the cut-off filter. Depending upon whether the band pass with the lower secondary maxima for the two components is disposed on the short wave side or on the long wave side of the considered stop band, a short wave or long wave transmitting cut-off filter is obtained.

In the case of the selection of the dimensions of the cut-off filter a precaution should be exercised to ensure that the envelopes of the secondary maxima of both components have zero locations which lie at somewhat different wavelengths so that at least one component of the wavelength to be transmitted does not attain the ideal reflectivity coefficient which is zero.

Figure 1:
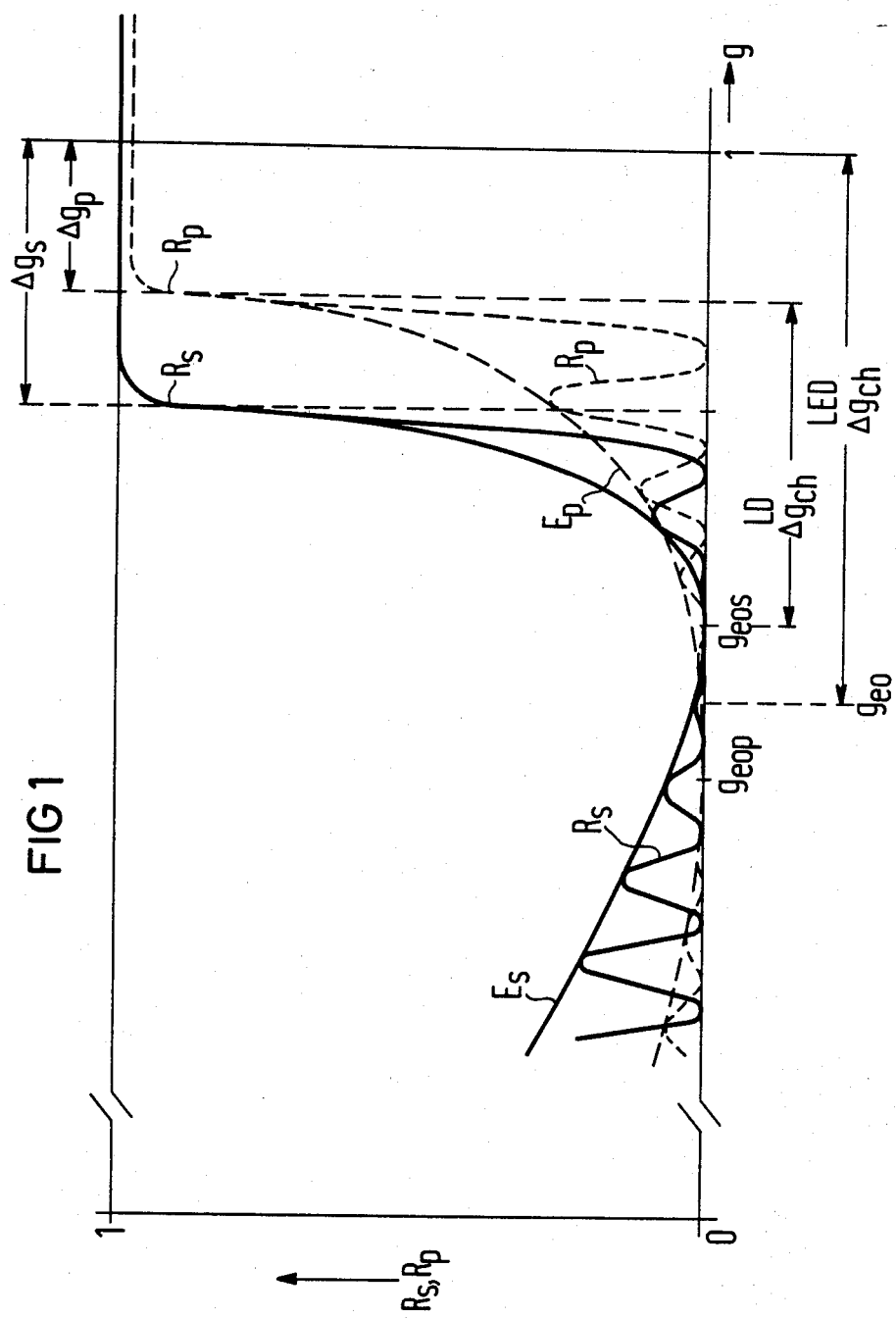
FIG. 1 graphically illustrates the reflectivity $R_s$ and $R_p$ as a function of the wave number g for the s and the p-components of a long wave transmitting cut-off filter which has an order L=0 in accordance with the present invention.

In the FIG. 1, such an incidence is illustrated. The $R_s$ illustrates a curved progression of the reflectivity of the cut-off filter for the s-component, which is taken as a basis and the $R_p$ designates the curved progression of the cut-off filter for the p-component. The $R_s$ and $R_p$ simultaneously indicate to the collapsing filter cut-off wavelength of both components. $E_s$ is the envelope of the reflection secondary maxima for the s-component and $E_p$ designates the envelope of the reflection secondary maxima for the p-component. Moreover, the envelopes of the reflection minima are constantly zero. This is due to the fact that the media border on both sides of the multi layer system exhibits the same index of refraction which is $n_0$.

The zero locations of the envelopes $E_s$ and $E_p$ of the reflection secondary maxima lie at point $g_{eos}$, or $g_{eop}$, respectively. Both zero locations are spaced apart and lie at somewhat different wavelengths in the proximity of the filter cut-off wavelengths. In FIG. 1, however, the wavelength number g, which is further defined hereinafter, is used instead of the wavelengths. The wavelengths to be reflected are selected for the band or region to the right and adjacent the cut-off filter length, whereas the wavelengths to be allowed to pass through the filter are selected from the closest vicinity of the wavelength pertaining to the wavelength number $g_{eos}$ and $g_{eop}$, and in particular pertaining to the wavelength number g between these two numbers. It can be clearly seen in FIG. 1 that, particularly between the two zero locations or points $g_{eop}$ and $g_{eos}$ in the envelope of the reflection secondary maxima, the reflectivity for both components is virtually zero.

For the dimensioning of a cut-off filter of the type $$S\left(\frac{A}{2} B \frac{A}{2}\right)^k S.$$

the following facts, magnitudes and formulas are decisive. The stop band centers lies at a wavelength $\lambda_L$ for which the effective optical layer thickness of every A and B layer amounts to an odd number multiple of the quarter wavelength. Thus, $$n_A t_A \cos \theta_A = n_B t_B \cos \theta_B = (2L + 1) \frac{\lambda_L}{4} \quad (1)$$

wherein $L = 0, 1, 2, 3 \ldots$
$n_A$ is the refractive index of the layer A which has a thickness $t_A$ and $n_B$ is the refractive index of the layer B which has a thickness $t_B$. $\theta_A$ is the refracting angle of the layer A while $\theta_B$ is the refracting angle for the layer B and both of these angles can be calculated from the formula $$\cos \theta_q = (1-(n_0/n_q)^2 \cdot \sin^2 \theta_0)^{\frac{1}{2}} \text{ with } q = A \text{ or } B. \quad (2)$$

L designates the order of the filter. From it follows the number of quarter wavelength layers which the effective optical layer thickness of every A and B layer must have.

In order to standardize the designation for the oblique radiation angle of incidence, it is expedient for each of the media to have two effective indices of refraction which for the s-component, is $$\eta_{qs} = n_q \cos \theta_q \quad (3)$$

and for the p-component is $$\eta_{qp} = n_q / \cos \theta_q \quad (4)$$

with $q = 0$ or A or B, whereby 0 relates to the transparent medium S; $n_0$ is thus the refractive index of the layer or material medium S; and $\theta_0$ signifies the radiation angle of incidence in the medium S.

For a cut-off filter of the order 0, the stop band center lies a $\lambda_0$. It is expedient to work with the relative wave number according to the following equation:

$$g = \lambda_0 / \lambda. \quad (5)$$

The stop band center lying at $\lambda_0$ correspondingly lies at $g = 1$.

For a cut-off filter of the order $L = 0$, the zero location of the envelope $E_i$ with $i = s$ or $p$ lies at $g_{eoi}$ which is found from the equation:

$$g_{eoi} = \frac{2}{\pi} \arccos \frac{(1-\eta_{Bi}/\eta_{Ai})(1+(\eta_{oi}/\eta_{Ai})^2)}{(1+\eta_{Bi}/\eta_{Ai})(1-(\eta_{oi}/\eta_{Ai})^2)}, i = s \text{ or } p \quad (6)$$

For a cut-off filter of the order L, the zero location of the envelope $E_i$ lies at $$g_{eLi} = 2L + 1 - (-1)^L(1 - g_{eoi}), L = 0, 1, 2, 3 \ldots \quad (7)$$

$i = s$ or p.

For the proposed cut-off filter, only the value pairs $n_A$ and $n_B$ enter into consideration for which the envelopes $E_s$ as well as $E_p$ exhibit a zero location. From the condition that the amount of the argument of the arc cos function in equation (6) is permitted to be smaller than or maximally equal to one, limiting or boundary curves result in the $n_A$-$n_B$ field which provide information regarding which pairs of values for $n_A$, $n_B$, and the envelopes $E_s$ and $E_p$ of the secondary maxima exhibit zero locations.

For example, in the range or band of interest with $n_A$, $n_B$ both greater than $n_0$, for a preselected radiation angle of incidence $\theta_0 = 45°$, zero locations for $E_s$ are obtained if the following relationship is satisfied.

$$n_B \leq n_0 \{4((n_A/n_0)^2 - \tfrac{1}{2})^3 + \tfrac{1}{2}\}^{\frac{1}{2}} \quad (8)$$

The zero locations are obtained for the envelope $E_p$ if the following equation is satisfied.

$$n_B \leq n_0 a'(1 + (1 - 1/a')^{\frac{1}{2}})^{\frac{1}{2}} \quad (9)$$

wherein $a'$ is $$a' = (n_A/n_0)^{12}/(2(n_A/n_0)^2 - 1)^3 \quad (10)$$

Figure 2:
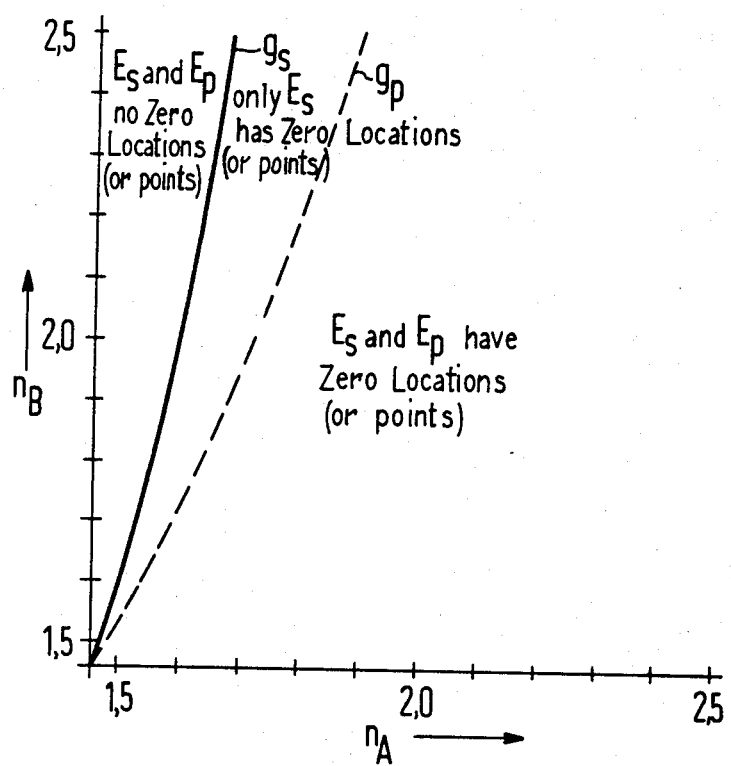
FIG. 2 illustrates curves $g_s$ and $g_p$ for a cut-off filter of the type of $$S\left(\frac{A}{2} B \frac{A}{2}\right)^k S,$$

In FIG. 2, the limiting curves, given by the equations 8 and 9 are illustrated and are designated $g_p$ and $g_s$. The limiting curves separate ranges or bands of values for $n_A$ and $n_B$ in which the $E_s$ and/or the $E_p$ exhibit or have zero locations. It can be seen in FIG. 2 that a wide range or band of values for the pairs of $n_A$, $n_B$ exist for which both the $E_s$ and $E_p$ exhibit or have zero locations.

For preselected radiation angles of incidence of $\theta_0 \neq 45°$, in particular for radiation angles of $\theta_0$ less than 45° (as in the case of $\theta_0 = 45°$), limiting curves and hence a band of values for the pairs of $n_A$ and $n_B$ can be determined for which $E_s$ and $E_p$ exhibit or have zero locations.

In FIG. 3, curves for $g_{eos}$ are shown in bold lines and curves for $g_{eop}$ are illustrated in broken lines for different values of $n_A$ as a function of $n_B$. It is also suitable to say that these two curves for $g_{eos}$ and $g_{eop}$ are illustrated for different values of $n_B$ as a function of $n_A$. The curve pertaining to $n_A$ belong to the same cut-off filter of the type $$S\left(\frac{A}{2} B \frac{A}{2}\right)^k S$$

whose stop band centers lies at $g = 1$. The curve pairs pertaining to various $n_A$ values belong to various cut-off filters of this type.

For a value of $0 < g_{eoi} < 1$ with i being equal to s or p, long wave transmitting cut-off filters are obtained and with the value of $1 < g_{eoi} < 2$ short wave transmitting cut-off filters are obtained. In FIG. 3, it can be learned that $g_{eos}$ and $g_{eop}$ curves pertaining respectively to the same cut-off filter spread apart more strongly in the range or band of the short wave transmitting cut-off filters than in the range of the long wave transmitting filters with the order of $L = 0$.

From FIG. 3 it can be seen that for the zero locations lying approximately at the stop band, the envelope $E_s$ has a zero location which always lies closer to the stop band than the zero location of the envelope $E_p$. From FIG. 3, it can be seen that if $n_0 = 1.46$ and if the specific range or value of $n_B$, which is the present example lies between 1.46 and 1.54, and $g_{eos}$ and $g_{eop}$ curves for the same cut-off filter intercept a given constant value, which in the present example amounts to two-thirds. Thus, in each of these intersecting points, $g_{eos}$ is equal to $g_{eop}$ and in the present example equal to two-thirds. Each of these intersecting points determines an optimized cut-off filter, for example a cut-off filter in which the envelopes $E_s$ and $E_p$ have a common zero location.

However, it is further apparent from FIG. 3 that it is possible to select the index of refraction $n_A$ and $n_B$ so that the $g_{eos}$ as well as the $g_{eop}$ become greater than the constant value and in the desired manner, move closer to the stop band. However, if the trivia case of $n_A = n_B$ is disregarded, the relationship of $g_{eos} = g_{eop}$ is no longer satisfied.

For a practical application of the cut-off filter, it is sufficient that $g_{eos}$ and $g_{eop}$ do not strongly differ from one another. Also, for a given difference $n_A - n_B$ for the indices of refraction, $g_{eos}$ and $g_{eop}$ become much smaller and the centers of the zero locations move much closer to the stop band center but depend on how much greater the selected value of $n_a$ is than $n_b$. Thus, for such a practical application the following relationship applies.

$$\bar{g}_{eo} = (g_{eos} + g_{eop})/2 \qquad (11)$$

Taking into consideration the available initial materials, it is therefore advantageous to select the indices of refraction $n_A$ and $n_B$ as high as possible. The effect obtained thereby however, must be considered in conjunction with the dependence of the stop band width for the s and p-components of the $n_A$ and $n_B$.

The results illustrated in FIG. 3 can also be employed for the purpose of dimensioning cut-off filters of the higher order L by using the above mentioned formula (7).

For a $g_{eoi} < 1$ ($g_{eoi} > 1$) with $i = s$ or $p$, a long wave (short wave) transmitting cut-off filter is obtained if L is an even number. If L is an odd number, a short wave (long wave) transmitting cut-off filter in obtained.

Before the practical dimensioning of the cut-off filters and the sample embodiments are discussed in greater detail, a series of general rules will be discussed. These rules should be observed in the case of the dimensioning of the cut-off filter of the type $$S\left(\frac{A}{2} B \frac{A}{2}\right)^k S$$

and the strict application of these values will provide a favorable filter construction as a consequence.

The refractive index of the mediums S should be as low as possible and at best it should be equal to one. It must be taken into consideration here that the radiation incident from the air can complicate the construction of the multi-demultiplexer with the cut-off filter of this type.

The radiation angle of incidence should be as small as possible. However, it should not become zero.

The divergence angle of the radiation impinging on the cut-off filter is to be as small as possible and, at best, should be zero.

The number of dielectric layers is to be as great as possible.

The layer A should have a higher refractive index than the layer B.

For obtaining a cut-off filter with a channel spacing which is small, the order $L = 1$ is more favorable than is the order $L = 0$.

The difference $n_A - n_B$ is to be as small as possible, but $n_A$ and $n_B$ are to be as great as possible.

The refracting angles in the individual layers of the cut-off filter clearly depart from the Brewster angle.

If $n_0$, the radiation angle of incidence $\theta_0$, and the wavelength $\lambda^{(1)}$ and $\lambda^{(2)}$, which are to be combined together or separated apart, are given, the following will show how a cut-off filter of the type $$S\left(\frac{A}{2} B \frac{A}{2}\right)^k S$$

can be dimensioned.

In order to be able to generally dimension a cut-off filter for two given wavelengths $\lambda^{(1)}$ and $\lambda^{(2)}$, the channel spacing minimally obtained from random layer materials must be known. If the radiation source does not relate to a spectrally narrow band laser diodes LD with a spectral half-intensity width of approximately 2 nm, but on the contrary if they relate to broad band luminescent diodes LED with a spectral half-intensity width of 20 nm to 40 nm, then the spectral band width must also be taken into consideration.

In the case of the laser diode, the attainable channel spacing $$\Delta g_{CH}^{LD}$$

is expediently defined by the spectral spacing between the zero location $g_{eos}$ of the envelope $E_s$ and the p-edge or cut-off of the respective stop band. According to FIG. 1 the following equation is valid.

$$\Delta g_{CH}^{LD} = 1 - \Delta g_p - g_{eos} \qquad (12)$$

For a luminescent diode LED, the following equation for the attainable channel spacing is meaningful.

$$\Delta g_{CH}^{LED} = 1 - \bar{g}_{eo} \qquad (13)$$

The center of the stop band can be selected because the stop bands, given the desired small difference $n_A - n_B$, become relatively narrow. The wavelength which is found for $\bar{g}_{eo}$ with the aid of the equation number 5 lies with a good approximation between the wavelengths belonging to $g_{eos}$ and $g_{eop}$ because the spacing between $g_{eos}$ and $g_{eop}$ is small.

From FIG. 1, it becomes clear that, by way of illustration, the magnitude or size $\Delta g_s - \Delta g_p$, for example the difference between the half stop band widths for the s and p-components respectively, finally determines the polarization effect which occurs. The half stop band widths $\Delta g_s$ and $\Delta g_p$ are calculated according to the following formula.

$$\Delta g_i = \frac{2}{\pi} \arcsin \left| \frac{\eta A_i - \eta B_i}{\eta A_i - \eta B_i} \right| \text{ where } i = s \text{ or } p \qquad (14)$$

In order to simplify the practical dimensionings, it is favorable to change over from the relative wave number g to the wavelengths. It is advantageous to use an illustration which utilizes, through suitable standardization, relative wavelength differences which are dimensionless. The results thus obtained are then applicable to all wavelengths.

The magnitudes of interest are the wavelength spacing or intervals $\Delta \lambda_s$ and $\Delta \lambda_p$ between the zero locations $g_{eos}$ and $g_{eop}$, respectively, and the p-edge or cut-off edge of the respective stop band. These two wavelength differences are standardized to the respective wavelength $\lambda_p$ of the respective edge or cut-off. The formula for calculating $\Delta\lambda_s/\lambda_p$ and $\Delta\lambda_p/\lambda_p$ for either short wave or long wave transmitting cut-off filters SWP and LWP respectively, of the order L=0 and L=1 are compiled in the following table.

TABLE 1

| | L | Type | $\dfrac{\Delta\lambda_s}{\lambda_p}$ | $\dfrac{\Delta\lambda_p}{\lambda_p}$ |
|---|---|---|---|---|
| $g_{eos} < 1$ | 0 | LWP | $\dfrac{1 - \Delta g_p - g_{eos}}{g_{eos}}$ | $\dfrac{1 - \Delta g_p - g_{eop}}{g_{eop}}$ |
| $g_{eop} < 1$ | 1 | SWP | $\dfrac{1 - \Delta g_p - g_{eos}}{4 - g_{eos}}$ | $\dfrac{1 - \Delta g_p - g_{eop}}{4 - g_{eop}}$ |
| $g_{eos} > 1$ | 0 | SWP | $\dfrac{g_{eos} - 1 - \Delta g_p}{g_{eos}}$ | $\dfrac{g_{eop} - 1 - \Delta g_p}{g_{eop}}$ |
| $g_{eop} > 1$ | 1 | LWP | $\dfrac{g_{eos} - 1 - \Delta g_p}{4 - g_{eos}}$ | $\dfrac{g_{eop} - 1 - \Delta g_p}{4 - g_{eop}}$ |

When making a comparison of the formulas for L=0 and L=1, the comparison shows that smaller values of $\Delta\lambda_s/\lambda_p$ and $\Delta\lambda_p/\lambda_p$ are obtained for L=1 than from the values for L=0. Therefore, for the purpose of achieving smaller channel spacing, a cut-off filter with an order L=1 is preferred over a cut-off filter with an order L=0.

For a cut-off filter of the type $$S\left(\frac{A}{2} B \frac{A}{2}\right)^k S,$$

it can also be derived from these formulas that the cut-off filter with $n_A$ greater than $n_B$ is preferable. For two given refractive indices $n_A$ and $n_B$, this filter supplies smaller values for $\Delta\lambda_s/\lambda_p$, $\Delta\lambda_p/\lambda_p$ and $\Delta\lambda_p/\lambda_p - \Delta\lambda_s/\lambda_p$. In addition, it can be shown that for a given refractive index difference, $n_A - n_B$, the value for $n_A$ must be selected to be as great as possible in order to obtain a small channel spacing. If, given the constant indices of refraction, one passes from the order L=0 to the order L=1, significant reductions will occur in the values for $\Delta\lambda_s/\lambda_p$, $\Delta\lambda_p/\lambda_p$ and $\Delta\lambda_p/\lambda_p - \Delta\lambda_s/\lambda_p$.

In the following Table 2, the data of four cut-off filters of the type $$S\left(\frac{A}{2} B \frac{A}{2}\right)^k S$$

with $n_A$ greater than $n_B$ are compiled which filters have been dimensioned in accordance with the previously disclosed principles and which filter can be employed for the purpose of a multi-/demultiplexing for two luminescent diodes of the wavelengths $$\lambda_{LED}^{(1)} \text{ and } \lambda_{LED}^{(2)}$$

or two laser diodes with the wavelengths $$\lambda_{LD}^{(1)} \text{ and } \lambda_{LD}^{(2)}.$$

The respectively given wavelengths are underlined in the Table. Also, given is the value of $n_0 = 1.46$ corresponding to the mean core refraction index of the gradient fiber which was used with the wavelength 850 nm and the radiation angle of incidence $\theta_0 = 45$.

TABLE 2

| Nr. | 1 | 2 | 3 | 4 |
|---|---|---|---|---|
| $\lambda_{LED}^{(1)} <$ | 755 nm | 755 nm | 800 nm | — |
| $< \lambda_{LED}^{(2)}$ | 825 nm | 840 nm | 850 nm | — |
| $\lambda_{LD}^{(1)} <$ | 766 nm | 755 nm | 811 nm | 800 nm |
| $< \lambda_{LD}^{(2)}$ | 808 nm | 825 nm | 837 nm | 850 nm |
| $n_0$ | 1.46 | 1.46 | 1.46 | 1.46 |
| $\theta_0$ | 45° | 45° | 45° | 45° |
| $n_A$ | 2.35 | 2.35 | 2.35 | 2.35 |
| $n_B$ | 1.70 | 1.52 | 1.90 | 1.65 |
| k | 13 | 12 | 18 | 13 |
| $R_{ms}$ | 1.000 | 1.000 | 1.000 | 1.000 |
| $R_{mp}$ | 0.980 | 0.986 | 0.980 | 0.985 |
| $R_m$ | 0.990 | 0.993 | 0.990 | 0.993 |
| L | 1 | 1 | 1 | 1 |
| $\lambda_0$ | 2475 nm | 2517 nm | 2550 nm | 2608 nm |
| $t_A$ | 293 nm | 298 nm | 302 nm | 309 nm |
| $t_B$ | 458 nm | 564 nm | 400 nm | 507 nm |
| $\lambda_p$ | 808 nm | 819 nm | 837 nm | 850 nm |
| $\lambda_s$ | 788 nm | 787 nm | 826 nm | 826 nm |
| Figure | 4 | — | 5 | 6 |

Since the equations, which are significant for the dimensioning and include the equations 6 and 14, are dependent only upon the two quotients $n_A/n_0$ and $n_B/n_0$ and not upon the values of $n_0$, $n_A$ and $n_B$, the results obtained for the refractive index $n_0$ can, moreover, be readily transformed for other values of the index of refraction for the bordering media.

In view of the different values for the dimensions and specification of the cut-off filters for a luminescent diodes and laser diodes, (see the equations 12 and 13), the type of radiation source must be taken into account in determining the dimensions. For the purpose of determining the dimensions, a filter of the order L=1 was assumed and on account of the required low channel spacing, a filter of the order L=0 were ruled out in advance.

In the case of the luminescent diode, the value $\bar{g}_{eo}$ and $\lambda_0$ following from the wavelengths are to be calculated depending upon the filter type with the values indicated in the following table 3. From $\bar{g}_{eo}$, with the aid of the equations 6 and 14 as well as from FIG. 3, the value pairs $n_A$ and $n_B$ of the refractive indices follow.

TABLE 3

| | | LED | | LD | |
|---|---|---|---|---|---|
| L | Type | $\bar{g}_{eo}$ | $\lambda_0$ | $\lambda_{LD}^{(1)}$ | $\lambda_{LD}^{(2)}$ |
| 0 | LWP | $\lambda_{LED}^{(1)}/\lambda_{LED}^{(2)}$ | $\lambda_{LED}^{(1)}$ | $\lambda_0/(1 - \Delta g_p)$ | $\lambda_0/g_{eos}$ |
| 1 | SWP | $4 - 3\lambda_{LED}^{(2)}/\lambda_{LED}^{(1)}$ | $3\lambda_{LED}^{(2)}$ | $\lambda_0/(4 - g_{eos})$ | $\lambda_0/(3 + \Delta g_p)$ |
| 0 | SWP | $\lambda_{LED}^{(2)}/\lambda_{LED}^{(1)}$ | $\lambda_{LED}^{(2)}$ | $\lambda_0/g_{eos}$ | $\lambda_0/(1 + \Delta g_p)$ |
| 1 | LWP | $4 - 3\lambda_{LED}^{(1)}/\lambda_{LED}^{(2)}$ | $3\lambda_{LED}^{(1)}$ | $\lambda_0/(3 - \Delta g_p)$ | $\lambda_0/(4 - g_{eos})$ |

The number k of the fundamental period is selected in the case of all examples so that for the stop band center, the maximum possible reflectivity amounts to $R_m = 0.99$ for the unpolarized radiation. The following formula is decisive $$T_{mi} = \frac{16}{4\left\{\left(\frac{\eta_{Ai}}{\eta_{Bi}}\right)^k + \left(\frac{\eta_{Bi}}{\eta_{Ai}}\right)^k\right\}^2 + \left(\frac{\eta_{oi}}{\eta_{Ai}} - \frac{\eta_{Ai}}{\eta_{oi}}\right)^2 \left\{\left(\frac{\eta_{Ai}}{\eta_{Bi}}\right)^k - \left(\frac{\eta_{Bi}}{\eta_{Ai}}\right)^k\right\}^2} \quad (15)$$

$T_{mi}$ signifies the maximum possible transmissability in the stop band center. If the dielectric multiple layer of the cut-off filter can be assumed to be lossless, the maximum possible reflectivity $R_{mi}$ in the stop band center follows therefrom the following equation.

$$R_{mi} = 1 - T_{mi} \quad i = s,p \quad (16)$$

The maximally possible reflectivity for unpolarized radiation follows therefrom the following equation:

$$R_m = \tfrac{1}{2}(R_{ms} + R_{mp}) \quad (17)$$

It can be stated that $R_m$ increases or grows with the increasing k and with the difference between $n_A$ and $n_B$. For a larger value of k, $R_m$ is virtually not dependent upon the wavelength within the stop band. No simple formulas can be given for the actual reflectivities.

From $\lambda_0$ with the aid of the equations 1 and 2, the layer thickness $t_A$ and $t_B$ will be obtained. The edge or cut-off wavelengths $\lambda_s$ and $\lambda_p$ of the s and p edge or cut-off which is of interest, respectively, follow from the equation 14.

If the cut-off filter, which is constructed for a luminescent diode LED, is employed as a multi- or demultiplexor for laser diodes, the wavelengths can be more closely adjusted.

$\lambda_{Lb}^{(1)}$ and $\lambda_{Lb}^{(2)}$ result are dependent from the formulas indicated in Table 2 and are dependent upon the filter type. Also, the following standardized wavelength differences $(\lambda_{Lb}^{(2)} - \lambda_{Lb}^{(1)})/\lambda_{Lb}^{(2)}$ for a short wave transmitting cut-off filters, or $(\lambda_{Lb}^{(2)} - \lambda_{Lb}^{(1)})/\lambda_{Lb}^{(1)}$ for a long wave transmitting cut-off filters are dependent upon the filter type and, in particular, are dependent upon the refractive indexes $n_A$ and $n_B$ which are illustrated and plotted in the curved field. For specific values of the standardized wavelength differences by utilizing the curved fields, a value for a pair of $n_A$ and $n_B$ of a refractive indices can be obtained and are dependent upon the filter type.

With the aid of the equations given in the following Table 4, the value of $g_{eos}$ follows from the value pair and provides $\lambda_0$ and hence the layer thicknesses of the corresponding filter type.

TABLE 4

| L | Type | $\lambda_0$ |
|---|------|------|
| 0 | LWP | $g_{eos} \lambda_{Lb}^{(2)}$ |
| 1 | SWP | $(4 - g_{eos}) \lambda_{Lb}^{(1)}$ |
| 0 | SWP | $g_{eos} \lambda_{Lb}^{(1)}$ |

TABLE 4-continued

| L | Type | $\lambda_0$ |
|---|------|------|
| 1 | LWP | $(4 - g_{eos}) \lambda_{Lb}^{(2)}$ |

The sample embodiment, which is described in column 2 of Table 2 has virtually the same layer design so that one obtains an optimum cut-off filter, i.e. $g_{eos} = g_{eop}$. This embodiment was proposed in an older German patent application No. P 29 46 647.5.

From the sample embodiments indicated in columns 1, 3 and 4 of the Table 2, the reflectivity $R_s$, $R_p$ and $R$ are plotted in FIGS. 4–6 against the wavelengths. These curves have been computed with the method of characteristic matrices which is described by H. A. Macleod, *Thin-Film Optical Filters*, London, Hilger, 1969.

From FIGS. 4–6, it follows that the wavelengths of the laser diode can be selected somewhat more closely adjacent than is disclosed in Table 2 without the filter properties becoming noticeable impaired.

$\lambda_{Lb}^{(1)}$ can generally be 5 to 10 nm greater than the value indicated in the Table. The spectral progression of R shows that the stop band width of the filter of the order L=1 becomes relatively narrow. If this band of reflectivity is to be broadened, complicated layer or film systems must be constructed. For example, such a system has been examined for perpendicular radiation incidence in Z. N. Elsner, "On the Calculation of Multilayer Interference Coatings with Given Spectral Characteristics," *Optics and Spectroscopy*, Vol. 17 No. 3, September 1964, pages 238–240; by A. F. Turner and P. W. Baumeister, "Multilayer Mirrors with High Reflectance Over an Extended Spectral Region," *Applied Optics*, Vol. 5, No. 1, January 1966, pages 69–76, and O. S. Heavens and H. M. Liddell, "Staggered Broad-Band Reflecting Multilayers," *Applied Optics*, Vol. 5, No. 3, March, 1966, pages 373–376.

The reflection curves illustrated in FIGS. 4–6 have been calculated under the assumption that a parallel radiation beam impinges on the cut-off filter. If a divergent radiation beam impinges on the filter instead of a parallel radiation beam, then the illustrated reflection curves are valid only by way of approximation. The divergence of the radiation beam essentially effects the leveling off or flattening of the spectral edge as well as cause a displacement to shorter wavelengths. If for example, no lenses are employed for the beam or ray formation in the medium S with the refractive index $n_0$, the divergent angle $\delta$ of the radiation beam results from the numerical aperture A of the employed glass fiber according to the following formula $$\delta = \pm \arcsin \frac{A}{n_0} \quad (18)$$

For a typically employed gradient fiber with a maximum numerical aperture A=0.18, and the mean core refractive index of $n_0$=1.46, the $\delta = \pm 7.1°$. For the two unfavorable instances, namely the limiting angle of $\theta=45°\pm\delta$, the refractive index R of the sample embodiment indicated in column 1 of Table 2 is jointly illustrated in FIG. 4. It must be noted here that on account of the parabolic refractive index profile of the gradient index fibers, the power of the light which is guided in the fiber at these limiting angles is equal to zero. Due to a more favorable power distribution, a gradient fiber is therefore preferable to a fiber with a stepped index of refraction.

The equality of two refractive indices is to be understood in terms of the present invention in such a manner that the equality must be satisfied to the second position to the right of the decimal. The fact that the zero location or point of an envelope falls apart somewhat is to merely indicate that in practice, the spacing between the zero locations cannot be permitted to be so great that the envelopes within the region between the zero locations exceeds a given permissible value. In giving such a value, which as a rule will be very small, for example, smaller than or considerably less than 0.2, the zero locations as a rule will lie relatively closely adjacent to one another. For example, the zero locations lie only at somewhat different wavelengths. However, this "somewhat" does not exclude a possible singular instance in which the zero locations can be relatively far removed or remote from one another. It also should be understood that in practice only the refractive index values for the dielectric layers enter into consideration in which the zero location of at least one of the envelopes, with the comparison of the optimized filter, lies closer to the filter edge.

Although various minor modifications may be suggested by those versed in the art, it should be understood that I wish to embody within the scope of the patent granted hereon, all such modifications as reasonably and properly come within the scope of my contribution to the art.

I claim:

1. In an optical cut-off filter in the form of a multi-layer system comprising a sequence of dielectric layers A and B interposed between a transparent bordering medium having an index of refraction $n_0$, and with an index of refraction $n_A$ for each of the layers A and an index of refraction $n_B$ for each of said layers B selected so that, for a preselected radiation angle of incidence $\theta$, the pass band of the filter has an envelope $E_s$ of the reflecting secondary maxima for the s-component vibrating perpendicular to the radiation plane of incidence and an envelope $E_p$ for the p-component vibrating parallel to the radiation plane of incidence of the electrical field vector of the incident radiation, and wherein each envelope has a zero location, the improvement comprising having the indices of refraction $n_A$ and $n_B$ of the dielectric layers A and B of the filter selected so that the zero locations of the two envelopes $E_s$ and $E_p$ lie at somewhat different wavelengths.

2. The optical cut-off filter according to claim 1, wherein the multi-system layer exhibits a layer structure $$S \left( \frac{A}{2} B \frac{A}{2} \right)^k S,$$

wherein $$\left( \frac{A}{2} B \frac{A}{2} \right)^k$$

signifies k multiple sequences of symmetrical layers A and B layers of a fundamental period of $$\frac{A}{2} B \frac{A}{2}$$

wherein the layer A/2 has the index of refraction $n_A$ and the layer B has the index of refraction $n_B$ and S signifies the bordering transparent medium having an index of refraction $n_0$.

3. The optical cut-off filter according to claim 2, wherein $n_0=1.46$, $n_A=2.35$, $n_B=1.70$ and $k=13$.

4. The optical cut-off filter according to claim 2, wherein $n_0=1.46$, $n_A=2.35$, $n_B=1.90$ and $k=18$.

5. The optical cut-off filter according to claim 2, wherein $n_0=1.46$, $n_A=2.35$, $n_B=1.65$ and $k=13$.

6. The optical cut-off filter according to claim 2, wherein $n_A > n_B$.

7. The optical cut-off filter according to claim 2, wherein the indices of refraction $n_A$ and $n_B$ are greater than the index of refraction $n_0$ of the transparent medium S.

8. The optical cut-off filter according to claim 7, wherein $n_A > n_B$.

9. The optical cut-off filter according to claim 7, wherein the radiation angle of incidence $\theta$ is at $\theta=45°$ and the indices of refraction $n_B$, $n_A$ and $n_0$ satisfy the following relationship:

$$n_B \leq n_0 \{4((n_A/n_0)^2 - \tfrac{1}{2})^3 + \tfrac{1}{4}\}^{\tfrac{1}{4}}, \text{ and}$$
$$n_B \leq n_0 \{a'(1 + (1 - 1/a')^{\tfrac{1}{2}})\}^{\tfrac{1}{2}}$$
$$\text{wherein } a' = (n_A/n_0)^{12}/(2(n_A/n_0)^2 - 1)^3.$$

10. The optical cut-off filter according to claim 9, wherein $n_A > n_B$.

* * * * *